United States Patent
Belliveau et al.

(10) Patent No.: US 7,635,188 B2
(45) Date of Patent: Dec. 22, 2009

(54) METHOD AND APPARATUS FOR CREATING A COLLAGE FROM A PLURALITY OF STAGE LIGHTS

(75) Inventors: Richard S. Belliveau, Austin, TX (US); Tom Grimes, Austin, TX (US)

(73) Assignee: Barco Lighting Systems, Inc., Austin, TX (US)

( * ) Notice: Subject to any disclaimer, the term of this patent is extended or adjusted under 35 U.S.C. 154(b) by 688 days.

(21) Appl. No.: 11/308,998

(22) Filed: Jun. 6, 2006

(65) Prior Publication Data

US 2007/0279600 A1  Dec. 6, 2007

(51) Int. Cl.
*G03B 21/26* (2006.01)
(52) U.S. Cl. .......................................... 353/30; 353/94
(58) Field of Classification Search ................. 345/1.3, 345/33, 4; 353/30, 44, 94, 69, 70
See application file for complete search history.

(56) References Cited

U.S. PATENT DOCUMENTS

| | | | |
|---|---|---|---|
| 3,706,914 A | 12/1972 | Van Buren | 315/316 |
| 3,898,643 A | 8/1975 | Ettlinger | 700/84 |
| 4,095,139 A | 6/1978 | Symonds | 315/153 |
| 4,697,227 A | 9/1987 | Callahan | 362/233 |
| 4,839,783 A * | 6/1989 | Arai | 362/374 |
| 5,113,332 A | 5/1992 | Richardson | 362/282 |
| 5,626,411 A * | 5/1997 | Takahashi et al. | 353/94 |
| 5,828,485 A | 10/1998 | Hewlett | 359/291 |
| 5,829,868 A | 11/1998 | Hutton | 362/276 |
| 5,988,817 A | 11/1999 | Mizushima | 353/94 |
| 6,057,958 A * | 5/2000 | Hunt | 359/291 |
| 6,099,128 A | 8/2000 | Jessl | 353/51 |
| 6,208,087 B1 | 3/2001 | Hughs | 315/291 |
| 6,219,093 B1 | 4/2001 | Perry | 348/135 |
| 6,331,756 B1 * | 12/2001 | Belliveau | 315/316 |
| 6,412,972 B1 | 7/2002 | Pujol | 362/294 |
| 6,480,175 B1 * | 11/2002 | Schneider | 345/32 |
| 6,588,944 B2 | 7/2003 | Harris | 385/88 |
| 6,671,005 B1 | 12/2003 | Pujol et al. | 348/771 |
| 6,727,864 B1 * | 4/2004 | Johnson et al. | 345/1.3 |
| 6,765,544 B1 | 7/2004 | Willson | 345/6 |
| 6,804,406 B1 * | 10/2004 | Chen | 382/254 |
| 6,812,653 B2 * | 11/2004 | Bellivean | 315/318 |
| 6,827,451 B2 * | 12/2004 | Belliveau | 353/31 |
| 6,866,390 B2 * | 3/2005 | Belliveau | 353/122 |
| 7,336,277 B1 * | 2/2008 | Clark et al. | 345/426 |

(Continued)

OTHER PUBLICATIONS

Toshiba Lighting Website page, Aug. 10, 2005, http://www.tlt.co.jp/tlt/art/english/english.htm.

(Continued)

*Primary Examiner*—Georgia Y Epps
*Assistant Examiner*—Danell L Owens
(74) *Attorney, Agent, or Firm*—Walter J. Tencza, Jr.

(57) ABSTRACT

An image projection lighting device is provided including a base, a communications port, a processor, a memory, and a lamp housing. A first image is stored in the memory. The image projection lighting device is configured to form a first sectional image from the first image stored in the memory and to project the first sectional image onto a projection surface as a component of a collage, in response to a first command and/or a second command.

30 Claims, 7 Drawing Sheets

U.S. PATENT DOCUMENTS

| | | | |
|---|---|---|---|
| 7,367,681 B2 * | 5/2008 | Harboe | 353/94 |
| 7,472,997 B2 * | 1/2009 | Miyazawa | 353/94 |
| 2003/0117343 A1 * | 6/2003 | Kling | 345/32 |
| 2004/0017164 A1 * | 1/2004 | Belliveau | 315/294 |
| 2004/0251855 A1 * | 12/2004 | Belliveau | 315/291 |
| 2005/0012474 A1 * | 1/2005 | Belliveau | 315/294 |
| 2005/0219271 A1 * | 10/2005 | Tanaka | 345/690 |
| 2005/0259084 A1 * | 11/2005 | Popovich et al. | 345/173 |
| 2006/0146295 A1 * | 7/2006 | Harboe | 353/94 |

OTHER PUBLICATIONS

Wholehog II Lighting Control Workstation, brochure.
2000 High End Systems Lighting-World-Wide® color brochure.

* cited by examiner

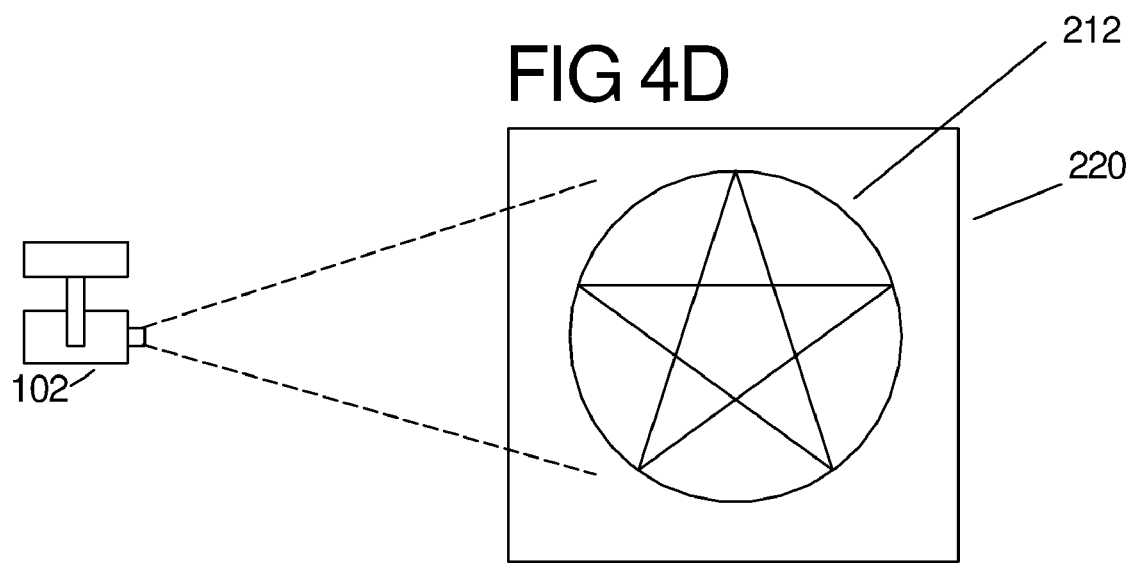
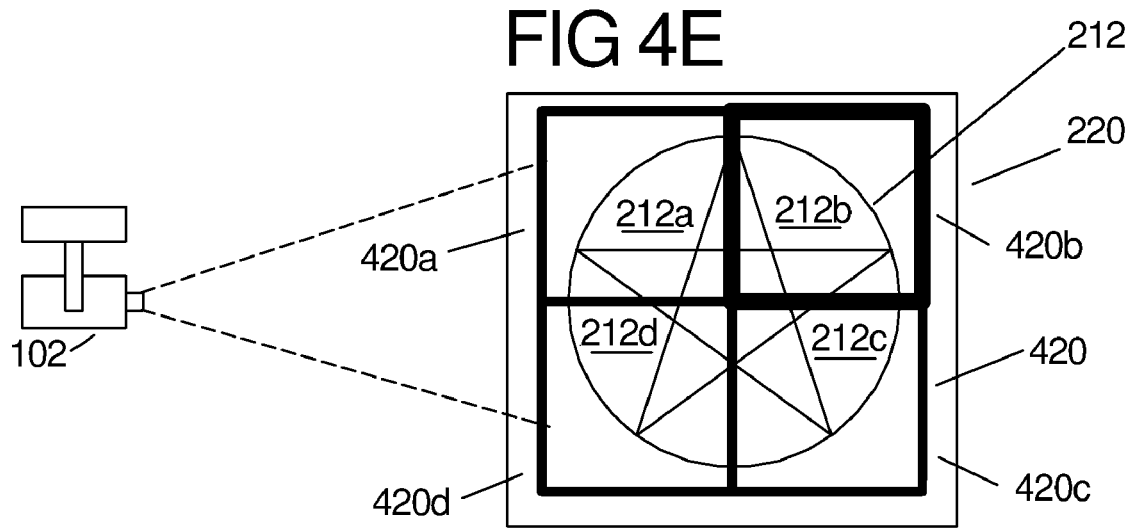
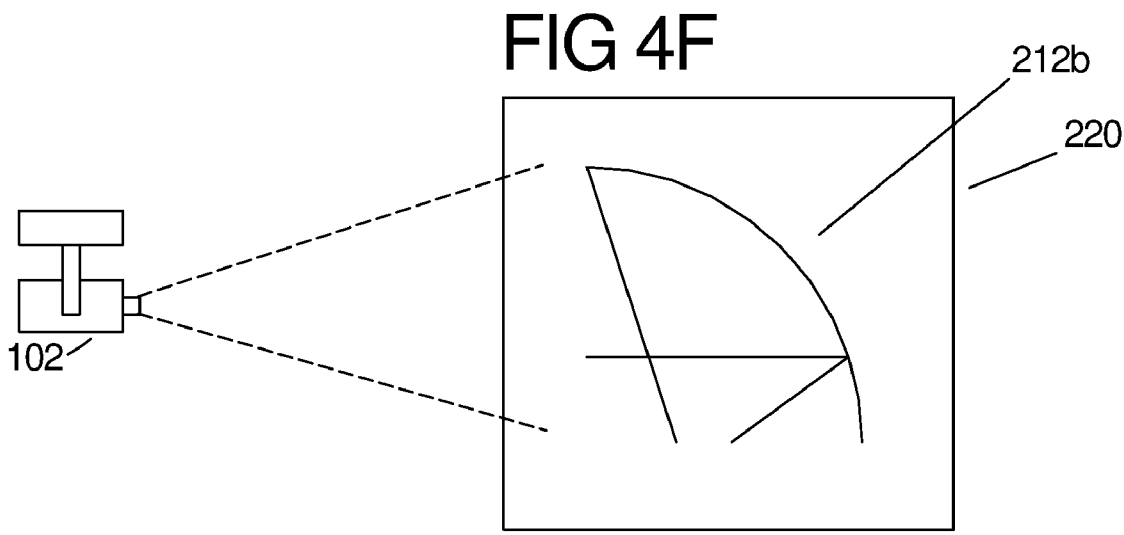

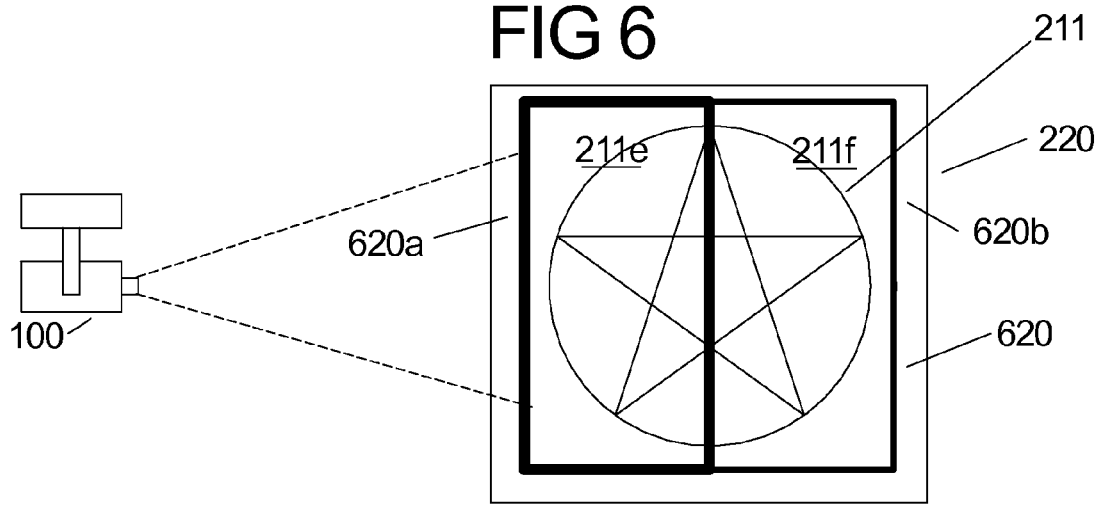

METHOD AND APPARATUS FOR CREATING A COLLAGE FROM A PLURALITY OF STAGE LIGHTS

FIELD OF THE INVENTION

The present invention relates to lighting systems.

BACKGROUND OF THE INVENTION

Lighting systems are formed typically by interconnecting many light fixtures by a communications system and providing for operator control from a central controller. Such lighting systems may contain multiparameter light fixtures, which illustratively are light fixtures having individually remotely adjustable parameters such as beam size, color, shape, angle, and other light characteristics. Multiparameter light fixtures are widely used in the lighting industry because they facilitate significant reductions in overall lighting system size and permit dynamic changes to the final lighting effect. Applications and events in which multiparameter light fixtures are used to great advantage include showrooms, television lighting, stage lighting, architectural lighting, live concerts, and theme parks. Illustrative multi-parameter light devices are disclosed in the product brochure entitled "The High End Systems Product Line 2001" and are available from High End Systems, Inc. of Austin, Tex.

To program the multiparameter lights, the operator inputs to a keyboard of the lighting central controller (or central controller) to send commands over the communications system to vary the parameters of the lights. When the operator of the lighting central controller has set the parameters of the multiparameter lights to produce the desired effect, the operator has produced a "scene." Each scene with its corresponding parameter values is then stored in the memory of the central controller for later recall by the operator or as an automated recall. As many as one hundred or more scenes may be put together to make a "show".

Prior to the advent of relatively small commercial digital controllers, remote control of light fixtures from a central controller was done with either a high voltage or low voltage current; see, e.g., U.S. Pat. No. 3,706,914, issued Dec. 19, 1972 to Van Buren, and U.S. Pat. No. 3,898,643, issued Aug. 5, 1975 to Ettlinger, both patents incorporated by reference herein. With the widespread use of digital computers, digital serial communications has been adopted as a way to achieve remote control; see, e.g., U.S. Pat. No. 4,095,139, issued Jun. 13, 1978 to Symonds et al., and U.S. Pat. No. 4,697,227, issued Sep. 29, 1987 to Callahan, both patents incorporated by reference herein.

A multiparameter light has several parameters that can be adjusted by remote control. A central controller is used in combination with a communications system to remotely control the multiparameter lights. Typically, the central controller is programmed in advance by an operator to control the lighting system. An example of a widely used central controller for multiparameter lights is the Whole Hog II, which is manufactured by Flying Pig Systems of 53 Northfield Road, London W13 9SY, and disclosed in a product brochure entitled "Whole Hog II, Lighting Control Workstation" available from Flying Pig Systems. Examples of some of the parameters that can be remotely controlled are position, color, pattern, iris, dimming, and shutter to name a few. Multiparameter lights can have over twelve parameters that are controlled by the central controller. Each multiparameter light can be set to respond to a specific address in the protocol used over the digital serial communication system. Typically the multiparameter light is first addressed by an operator of the central controller and next a parameter of the multiparameter light is adjusted from the central controller by the operator.

Prior art multiparameter lights typically have used metal or glass masks to act as a slide for the projection of an image. The metal or glass masks made for the lights are referred to in the industry as "gobos". A type of advanced multiparameter light fixture which is referred to herein as an image projection lighting device ("IPLD") uses a light valve to project images onto a stage or other projection surface. A light valve, which is also known as an image gate, is a device such as a digital micro-mirror ("DMD") or a liquid crystal display ("LCD") that forms the image that is projected. Other types of light valves are LCOS and MEMS. U.S. Pat. No. 6,057,958, issued May 2, 2000 to Hunt, incorporated by reference herein, discloses a pixel based gobo record control format for storing gobo images in the memory of a light fixture. The gobo images can be recalled and modified from commands sent by the control console. U.S. Pat. No. 5,829,868, issued Nov. 3, 1998 to Hutton and incorporated by reference herein, discloses storing video frames as cues locally in a lamp, and supplying them as directed to the image gate to produce animated and real-time imaging. A single frame can also be manipulated through processing to produce multiple variations. Alternatively, a video communications link can be employed to supply continuous video from a remote source.

U.S. Pat. No. 5,828,485, issued Oct. 27, 1998 to Hewlett and incorporated by reference herein, discloses the use of a camera with a DMD equipped lighting fixture for the purpose of following the shape of the performer and illuminating the performer using a shape that adaptively follows the performer's image. The camera acquiring the image preferably is located at the lamp illuminating the scene in order to avoid parallax. The image can be manually investigated at each lamp or downloaded to some central processor for this purpose. This results in a shadowless follow spot.

A multiprojector system in which an image is projected by plural projectors is disclosed in U.S. Pat. No. 5,988,817, incorporated by reference herein. The multiprojector system uses a number of "image-inputting" devices, one for each image that is to be projected by the projectors. The images to be projected are furnished to a multiple video processor, from which they are directed to the projectors. Where an image is to be enlarged and projected by two, four or more projectors, the image is enlarged in the multiple video processor before being supplied to the projectors. Disadvantageously, the use of multiple image-inputting devices and a multiple video processor is generally unfamiliar to many operators of lighting systems, and increases the setup complexity of the lighting system.

An additional description of how a plurality of IPLDs can be operated to form a collage can be found in my U.S. Pat. Nos. 6,812,653 and 6,812,653, incorporated by reference herein, each titled "Method and apparatus for controlling images with image projection lighting devices."

One type of IPLD manufactured by High End Systems is referred to as the DL-2 (Digital Light 2). The DL-2 is able to store images in an on-board memory. The images stored in the memory of the DL-2 can be varied and projected by the DL-2 in response to DMX commands received over a communications system sent by a central controller. The term "image" is a general term that refers to a wide variety of content types, including continuous video images such as movies and animation, graphic effects, and news programs, and still images such as still clips, pictures, clip art, sketches, and so forth.

My U.S. Pat. No. 6,812,653, incorporated by reference herein, teaches showing a collage type on a display device of the central controller to an operator. U.S. Pat. No. 6,812,653 teaches that "The Collage Generator screen 1202 of FIG. 12 includes a collage output area 1285. The kind of collage desired by the operator preferably is selected from a list 1286 of various types, although it may be manually designated or selected from a collection of icons, or in any other desired manner." Unfortunately the present art central controllers do not presently display on a display device a collage generator type in the form of displaying the tiles that compose a collage. The operator of the present art central controller could determine by alphanumeric a selection of what type of collage and what sectional image an IPLD may project but this is not as intuitive as visualizing a tiled graphic.

SUMMARY OF THE INVENTION

There is a need provide an operator a graphical presentation of the tiles for creating a collage type when such graphical representation is not available from the present art central controller. Advantageously, at least one embodiment of the present invention provides an improved IPLD that can project onto a projection surface the type of collage in a graphical form to an operator or technician.

There is a need for an IPLD under control of a central controller to automatically create a sectional image used in the creation of a collage from an image residing in the memory of an IPLD.

One or more of these needs is/are addressed by each of the various embodiments of the present invention. One embodiment of the present invention is a method of projecting graphical representations of various collage types on a projection surface by an IPLD.

Another embodiment of the present invention allows an operator of the central controller to select one of various collage types that are projected by an IPLD in graphical form.

An additional embodiment of the present invention provides a method of selecting what sectional image of a predetermined collage type is to be projected by a particular IPLD.

Another embodiment of the present invention provides a method of automatically creating a sectional image used in the creation of a collage from an image residing in the memory of an IPLD.

Yet another embodiment of the present invention provides a method of projecting a sectional image on a projection surface at a first location by an IPLD and remotely positioning the lamp housing of the IPLD to project the sectional image at a second location to form a collage.

A further embodiment of the present invention provides a method of projecting a sectional image that forms a collage by an IPLD at a first location on the projection surface and remotely positioning the lamp housing of the IPLD to project the sectional image at a second location on the projection surface where the second location of the sectional image on the projection surface does not form a collage.

BRIEF DESCRIPTION OF THE DRAWINGS

FIG. 4D shows a second IPLD projecting the first image to be collaged for use in accordance with an embodiment of the present invention;

FIG. 4E shows the IPLD of FIG. 4D projecting a graphical representation of first collage type in accordance with an embodiment of the present invention;

FIG. 4F shows the IPLD of FIG. 4D projecting a second sectional image of the first collage type in accordance with an embodiment of the present invention;

FIG. 6 shows an IPLD projecting a graphical representation of a second collage type and a second image in accordance with an embodiment of the present invention.

DETAILED DESCRIPTION OF THE DRAWINGS

Figure 1:
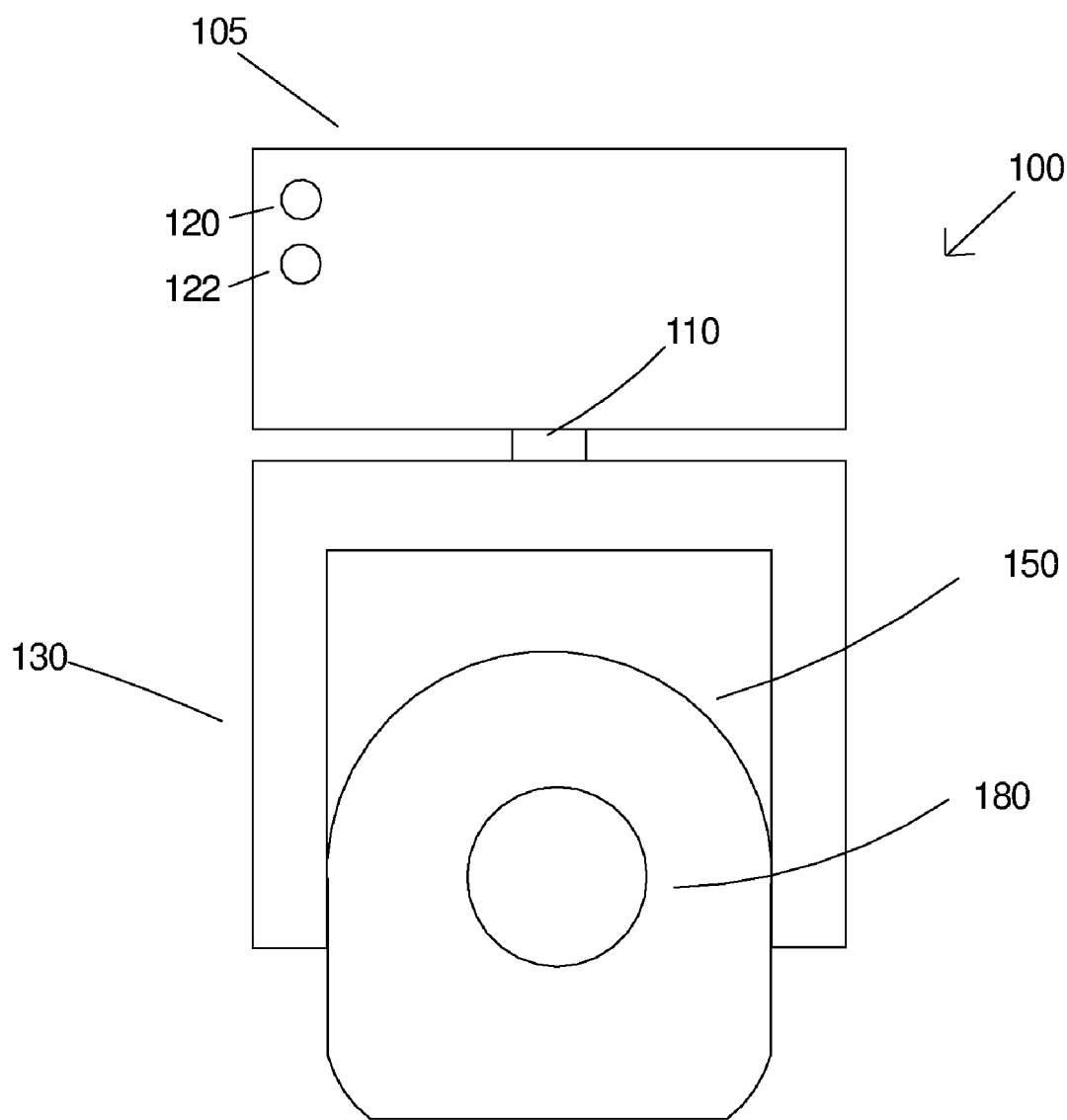
FIG. 1 shows an image projection lighting device for use in accordance with an embodiment of the present invention including a base housing, a yoke and a lamp housing.

In the description that follows, like parts are marked throughout the specifications and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce the desired results.

FIG. 1 shows a front view on an IPLD that may incorporate one or more embodiments of the present invention. The IPLD 100 includes a base housing or electronics housing 105, a yoke 130 and a lamp housing 150. The IPLDs 100, 102, 104 and 106, each shown in one or more of the figures in this disclosure may be identical to one another. The base housing 105 of the IPLD 100 includes communications connection points 120 and 122 for electrically connecting communications lines, such as communications line 230 of FIG. 2. The yoke 130 is physically connected to the housing 105 by a bearing 110, which allows the yoke 130 to pan or rotate in relation to the base or electronics housing 105. The lamp housing 150 is rotatably connected to the yoke 130 (bearings not shown for simplification). The lamp housing 150 can be remotely positioned in relation to the yoke 130 and the base housing 105 by motors or other actuator types (not shown for simplification) as known in the art. The lamp housing 150 typically contains optical components and at least one light valve. An exit aperture or lens 180 is shown for projecting lighted images from a projection lamp, such as a lamp 345 shown in FIG. 3. The projection lamp 345 shown in FIG. 3 is shown as a single lamp but it is known in the art to use two or more projection lamps working as a single projection lamp. IPLD 100 is shown with a separate base housing 105 and lamp housing 150, however it is known in the art to produce an IPLD with a single housing using a mirror to position the projected light.

Figure 2:
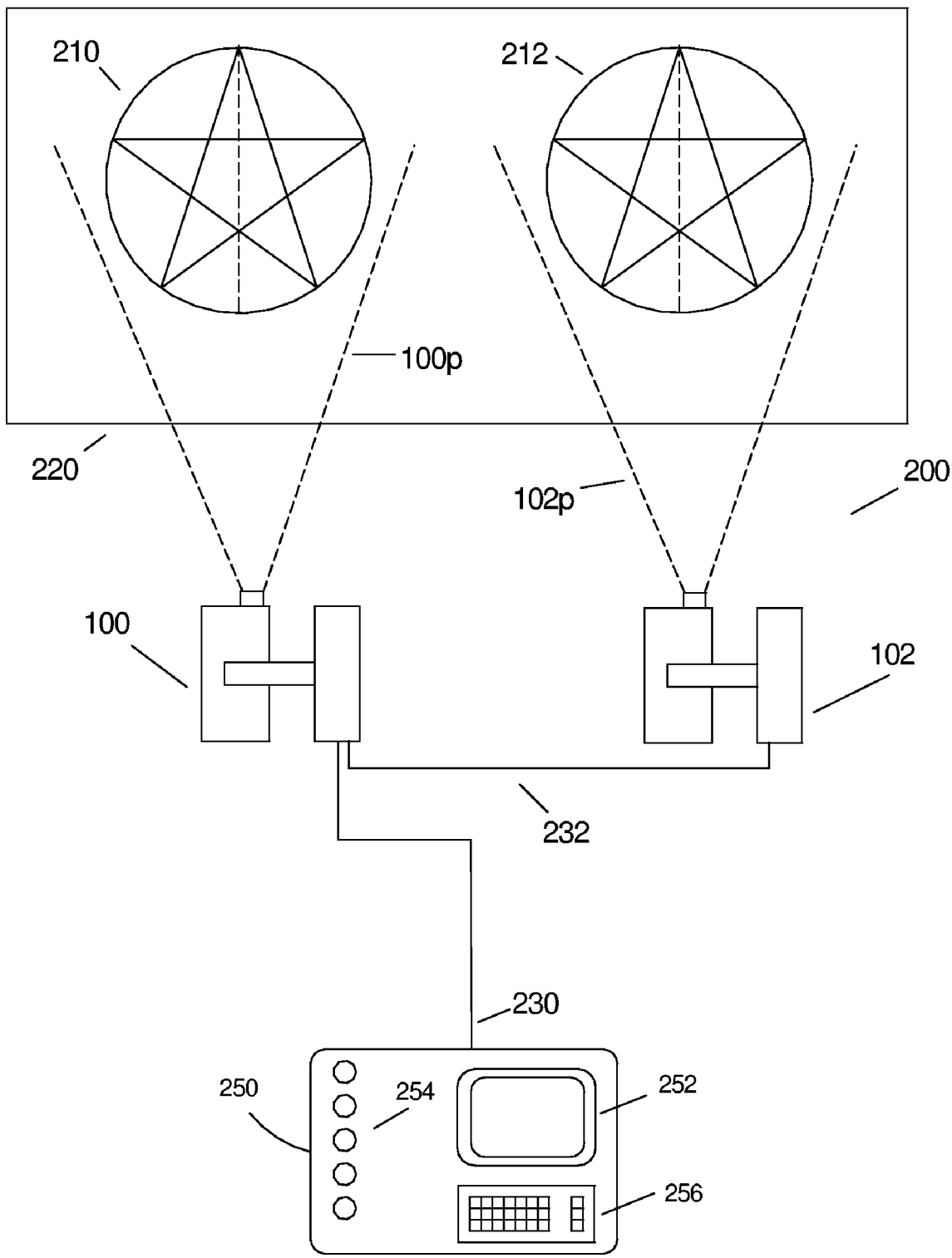
FIG. 2 shows a lighting system for use in accordance with an embodiment of the present invention.
Figure 3:
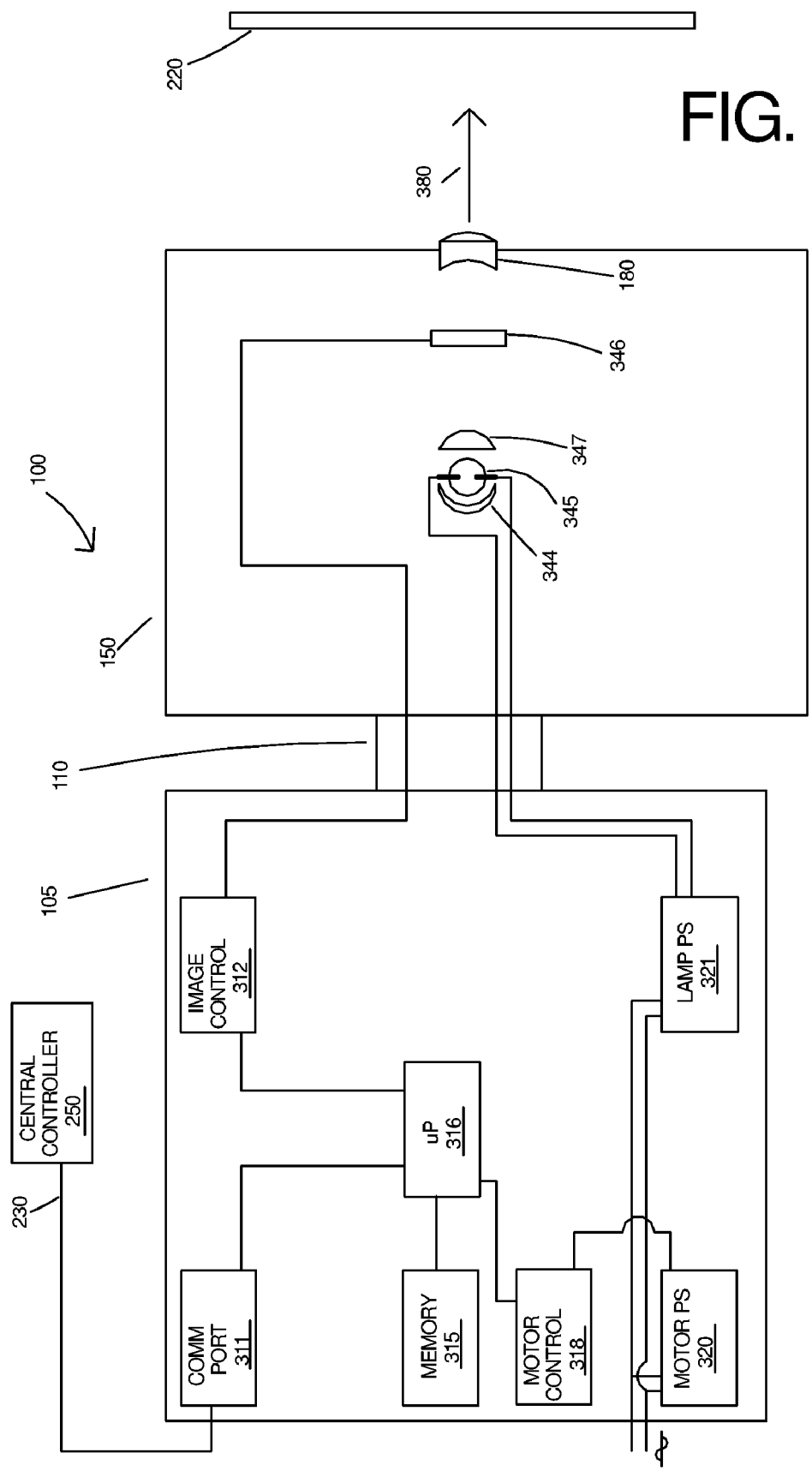
FIG. 3 shows a block diagram of components within the base housing and the lamp housing of the IPLD of FIG. 1 for use in accordance with an embodiment of the present invention.

FIG. 2 shows a lighting system 200 in accordance with an embodiment of the present invention. The lighting system 200 is comprised of IPLDs 100 and 102, communications lines 230, 232 and a central controller 250. Dotted lines 100p and 102p represent the path of the projected light from the IPLDs 100 and 102 respectively, as it is directed towards the projection surface 220. The same circled star images 210 and 212 are being projected on to the projection surface 220 by IPLDs 100 and 102 respectively. Image 210 originates from the memory of IPLD 100 while image 212 originates from the memory of IPLD 102. The image of a circled star is one image by way of example but the image could be any image stored in the memory of the IPLDs 100 and 102 and includes but is not limited to full motion video images.

FIG. 2 also shows input devices 254, an entry keypad 256 and a visual display device 252 for use with the central controller 250. The central controller 250 can communicate to send operational commands to the IPLDs 100 and 102 by communicating over the communications lines 230 and 232. The communications lines 230 and 232 may be of the electrical conductor type or optical fiber. It is also known in the prior art lighting systems to use a wireless method. The communication from the central controller 230 to the IPLDs 100 and 102 can use the DMX protocol as adopted by the United States Institute for Theatre Technology (USITT) and is well known to theatrical professionals. Alternatively the communication from the central controller 230 to the IPLDs 100 or 102 may use the Ethernet protocol or other adaptations such as known in the art.

FIG. 3 is a block diagram showing components within or part of the base housing 105 and within or part of the lamp housing 150 of the IPLD 102. FIG. 3 also shows the central controller 250. A microprocessor 316 may be made up of discrete electronic parts or the microprocessor 316 may be made up of several processors. The components within or part of the base housing 105 includes a communications port (shown as "comm port") 311, an image control 312, a memory 315, the microprocessor or processor 316, a motor control 318, a motor power supply 320 and a lamp power supply 321. A bearing 110 is shown rotatably connecting the lamp housing 150 to the base housing 105, in FIG. 3, and although only one bearing is shown for simplification more than one bearing may rotatably connect the lamp housing 150 to the base housing 105, i.e. so that the lamp housing 150 can rotate with respect to the base housing 105. Motors or other actuator types that can rotate the lamp housing 150 in relation to the base housing 105 as known in the art are not shown for simplification.

The lamp housing 150 of FIG. 3 houses the lamp 345, reflector 344, condensing lens 347, light valve 346 and output lens or aperture 180. The output light from the IPLD 100 of FIG. 3 is shown directed towards the projection surface 220 in the direction of arrow 380.

The central controller 250 of FIG. 2 can send commands to the IPLDs 100 and 102 of FIG. 2 and IPLDs 100, 102, 104, and 106 of FIG. 5 to vary parameters as known in the art under control of an operator. Some of the parameters to be varied by the central controller are the remote panning and tilting of the lamp housing 150 of FIG. 1 in relation to the yoke 130 and/or the base housing 105. An operator of the central controller 250 of FIG. 2 may also use the central controller 250 of FIG. 2 to call up and project images onto the projection surface 220 of FIG. 2 that reside in the memory 315 of FIG. 3. Other parameters of IPLDs that can be varied as known in the art are color, intensity, and blackout.

Figure 4A:
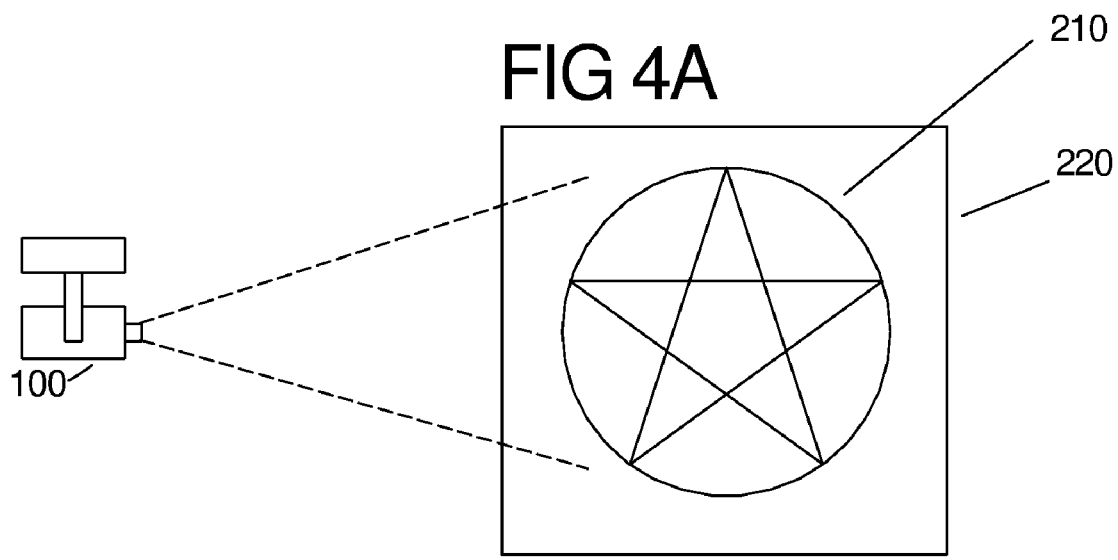
FIG. 4A shows a first IPLD projecting a first image to be collaged for use in accordance with an embodiment of the present invention.
Figure 4B:
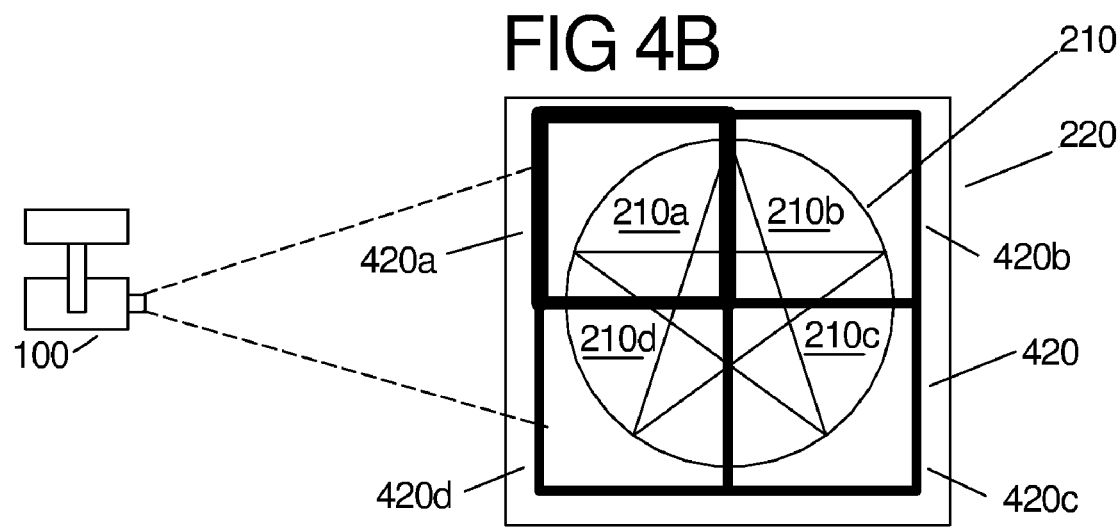
FIG. 4B shows the IPLD of FIG. 4A projecting a graphical representation of first collage type in accordance with an embodiment of the present invention.
Figure 4C:
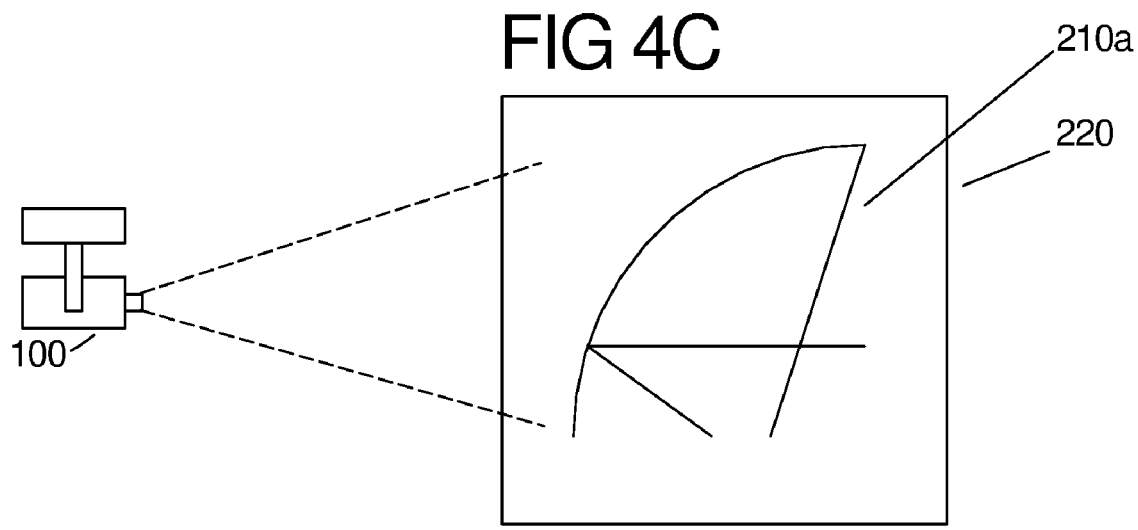
FIG. 4C shows the IPLD of FIG. 4B projecting a first sectional image of the first collage type in accordance with an embodiment of the present invention.

FIG. 4A shows IPLD 100 projecting a first image of a circled star 210 onto a projection surface 220. FIG. 4B shows IPLD 100 projecting a graphic of a 2×2 collage type 420 over the top of the first image 210 on the projections surface 220. The 2×2 collage type 420 would require four IPLDs to form. The four tiles 420a, 420b, 420c and 420d each divide the first image 210 into the four sectional images 210a, 210b, 210c and 210d that make up the 2×2 collage type. Tile 420a is shown in bold to show that sectional image 210a has been chosen to be the component of the 2×2 collage that IPLD 100 will project. FIG. 4C shows that the operator of the central controller 250 of FIG. 2 has been chosen to project sectional image 210a by IPLD 100.

FIG. 4D shows IPLD 102 projecting a first image of a circled star 212 onto a projection surface 220. FIG. 4E shows IPLD 102 projecting a graphic of a 2×2 collage type 420 over the top of the first image 212 on the projection surface 220. The four tiles 420a, 420b, 420c and 420d each divide the first image 212 into the four sectional images 212a, 212b, 212c and 212d that make up the 2×2 collage type. Tile 420b is shown in bold to show that sectional image 212b has been chosen to be the component of the 2×2 collage that IPLD 102 will project. FIG. 4C shows that the operator of the central controller 250 of FIG. 2 has chosen to project sectional image 212b by IPLD 102. IPLDs 104 and 106 of FIG. 5 would each be instructed by an operator of the central controller 250 of FIG. 2 using the same actions as above to project their corresponding sectional images 214c and 216d, shown in FIG. 5A, respectively onto the projection surface 220.

Figure 5A:
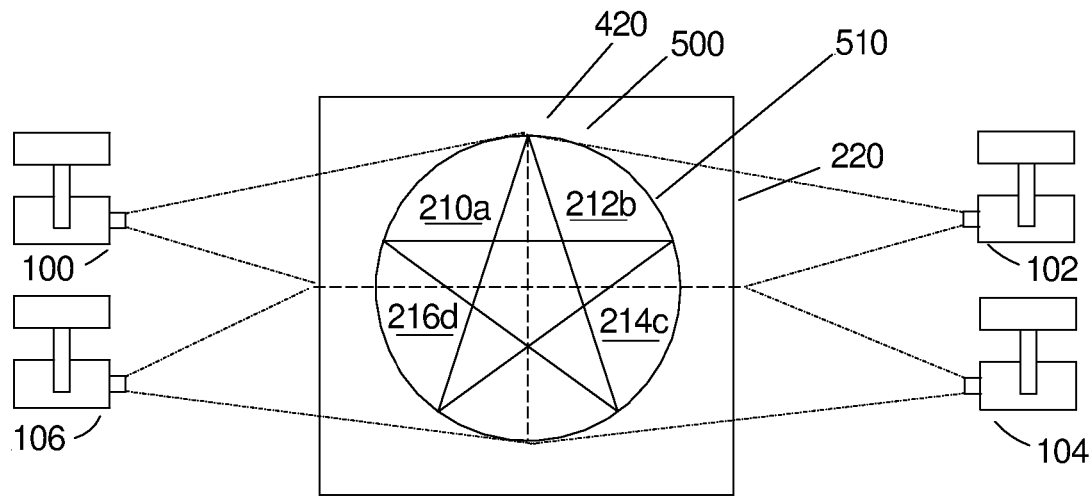
FIG. 5A shows a plurality of IPLDs forming the first collage type in accordance with an embodiment of the present invention.

FIG. 5A shows IPLDs 100, 102, 104 and 106 forming a collage 500 which is the 2×2 type of collage 420 of FIGS. 4B and 4E. IPLDs 100, 102, 104 and 106 are projecting sectional images 210a, 212b, 214c and 216d, respectively, that creates the collage image of the circled star 510 which visually is the same image as image 210 of FIG. 4A and image 212 of FIG. 4D. The description of "visually is the same image" in this disclosure means that a collage image created from a group of sectional images (like collage image 510) visually looks the same as the first image (like image 210) and is made substantially whole by combining the sectional images. It is considered visually the same if it is substantially whole however the aspect or dimensions may change such as stretching, or enlarging.

Figure 5B:
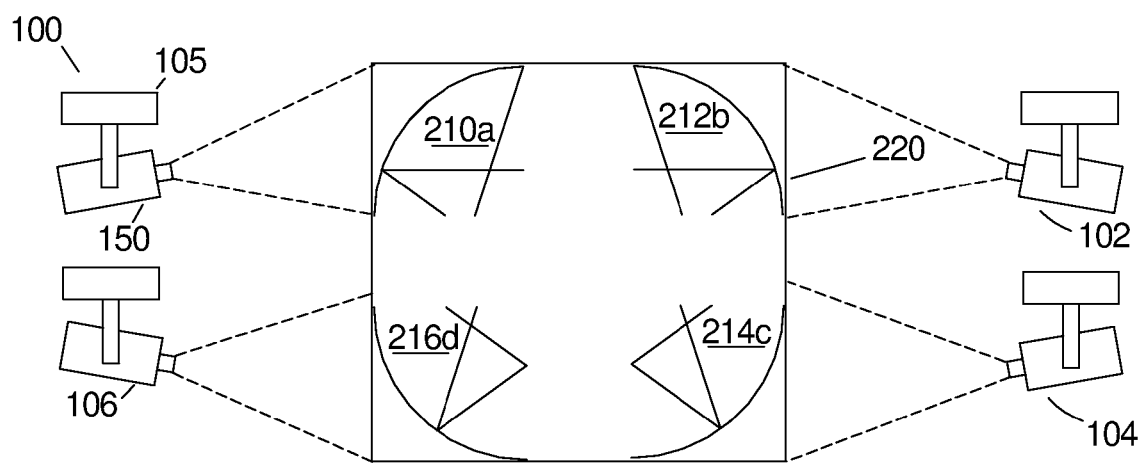
FIG. 5B shows a plurality of IPLDs with their pan and tilt parameters varied from that of FIG. 5A so they are not aligned to create the collage of FIG. 5A.

FIG. 5B shows IPLDs 100, 102, 104 and 106 projecting sectional images 210a, 212b, 214c and 216d, respectively, onto the projection surface 220. However in FIG. 5B the IPLDs 100, 102, 104 and 106 have their pan and tilt parameters varied so that the position of the projected images 210a, 212b, 214c, and 216d are not aligned to create the collage 500 of FIG. 5A and hence the collage image 510 is not created.

FIG. 6 illustrates a 2×1 collage type 620 projected across a second image 211 of an elephant on the projection surface 220. Any image selected from the plurality of images stored in the memory 315 of FIG. 3 could be used. Any of the plurality of images may be still images or movie images. The image of the star in a circle is shown as a still image by virtue of the drawing however the image of the star in a circle could be one of many frames in a movie of the star in a circle. The 2×1 collage type 620 would require two IPLDs to form. The two sections of the collage type 620a and 620b are shown that designate the sectional images 211e and 211f. 620a is shown in bold to show that sectional image 211e would be chosen to be projected by IPLD 100 when forming the collage type 620.

To operate the IPLD collage generator functions the operator can first choose a first image to collage. The operator first enters the unique address of the IPLD the operator wishes to control by inputting to the input devices 254 or the input keyboard 256 of the central controller 250 of FIG. 2 as known in the art. IPLDs 100, 102, 104 and 106 of FIG. 5A all have a unique address that allows them to be individually controlled by unique address signals transmitted by the central controller 250 of FIG. 2. After the operator selects a designated IPLD (IPLD 100 by way of example) a first image is chosen from the central controller 250 of FIG. 2 by inputting to the input devices 254 or the input keyboard 256. Other types of input devices on the central controller 250 could be used but are not shown for simplification. The central controller 250 of FIG. 2 sends a command over the communication system to IPLD 100 to project on to the projection surface 220 a chosen first image from the memory 315 of FIG. 2. The first image to be projected by IPLD 100 (by way of example) is the circled star 210 of FIG. 4A. FIG. 4A shows IPLD 100 projecting the first image 210 of the circled star on to the projection surface 220.

After choosing the first image 210 as illustrated by FIG. 4A the operator of the central controller 250 of FIG. 2 may next select a type of collage to be used with the first image. To do this the operator of the central controller 250 of FIG. 2 varies a "Collage Type" parameter of the IPLD 100 by varying one of the input devices 254 or 256 while communicating to IPLD 100 of FIG. 4A. By way of example in FIG. 4B the operator has chosen the 2×2 collage type 420. By choosing collage type 420 the operator visualizes the collage type 420 is comprised of four tiles. This means that to create the type 420 collage it will require four IPLDs to produce. When the collage type parameter of the IPLD 100 is varied by the central controller 250 of FIG. 2 the IPLD 100 may project several different collage types in graphical form such as 420 of FIG. 4B and 620 of FIG. 6. It is also not necessary to first select a first image before projecting a collage type in graphical form from the IPLD 100. Obviously the selection of the collage type and the appropriate sectional image to be projected by the IPLD 100 can be done without putting the first image in the background. However it is preferred to project the first image on to the projection surface 220 of FIG. 4A before selecting a collage type as this provides the operator of the central controller 250 of FIG. 2 with a more clear understanding of what the selected sectional image will look like. Many different collage types can be formed on the projection surface 220 during a show. A plurality of image projection lighting devices of the invention can reposition a plurality of sectional images using the pan and tilt parameter on the projection surface 220 to form a plurality of different collage types using a plurality of different images.

After the collage type 420 of FIG. 4B has been selected by varying the collage type parameter of IPLD 100 the operator next varies an "Image Section" parameter of the IPLD 100. The image section parameter allows the operator of the central controller 250 of FIG. 2 the ability to chose what sectional image of the collage 420 the IPLD 100 of FIG. 4B will project when actually creating the collage 500 of FIG. 5A. In FIG. 4B we can see that four tiles 420a, 420b, 420c and 420d are shown representing the sectional images 210a, 210b, 210c and 210d, respectively. FIG. 4B shows that tile 420a is shown in bold meaning that the sectional image 210a will be projected by IPLD 100 of FIG. 5A when the collage 500 creates the collage image 510. When the image section parameter of the IPLD 100 is varied by the central controller 250 of FIG. 2 the bold area of the collage type 420 of FIG. 4B can outline any of the tiles 210a, 210b, 210c or 210d as a way of visualizing to the operator what tile of the collage 420 will be projected by the IPLD 100. FIG. 4E for example shows that tile 420b is shown in bold for collage type 420. By varying the image section parameter of the IPLD 100 any of the four tiles 420a, 420b, 420c, and 420d can be selected by the operator of the central controller 250 of FIG. 2 and by selecting the tile the corresponding sectional image 210a, 210b, 210c or 210d will be projected by the IPLD 100 in forming the collage 500 of FIG. 5A. The selected image section can be made bold or the color of the selected image section can be changed. Any graphic that shows the selected image section can be used.

Varying the "collage type" parameter of the IPLD 100 projects in graphical form on to the projection surface 220 to an operator of the central controller 250 of FIG. 2 the type of collage and how many IPLDs will be needed in forming the collage. Varying the "image section" parameter projects in graphical form on the projection surface 220 to an operator of central controller 250 of FIG. 2 the chosen sectional image of the collage type the IPLD 100 will project in forming the collage.

The graphical representations of the collage types and graphical representations of the bold tiles are derived from pre-programmed algorithms in the operational code for the IPLD 100 and are stored in the memory 315 of FIG. 3. Alternatively the collage types and bold tiles can be predetermined images that are stored in the memory 315 of FIG. 3. In any case the communications port 311 receives addressing and command signals over the communications line 230 from the central controller 250. The received commands from the central controller vary the parameters of the IPLD 100 such as pan and tilt (the position of the projected light on the projection surface); the selection of images called up from the memory 315, the collage type, and the image section and may also include intensity and color. The communication protocol that sends the commands between the central controller 250 of FIG. 3 and the IPLD 100 may be the DMX protocol.

The IPLD 100 can be commanded by the central controller 250 of FIG. 2 to select a particular collage type by receiving commands to vary the collage type parameters. The image section parameter of IPLD 100 is varied by the central controller 250 to select the sectional image that the IPLD 100 will project when forming the collage. The sectional image, such as sectional image 210a of FIG. 4C, is generated by the ILPD from the first image 210 stored in the memory 315 of FIG. 4B. The first image pixels from the first image 210 of FIG. 4A stored in the memory 315 of FIG. 3, are dissected to form the sectional image 210a of FIG. 4C. The dissection for the first image 210 stored in the memory can take place at the image control 312 of FIG. 3. The image control 312 of FIG. 3 may be a computer graphics card capable of image manipulation. The first image 210 stored in the memory 315 may be sent to the image control 312 by the processor 316 to be dissected into the sectional image 210a. The image control 312 of FIG. 3 maps out the pixels shown in tile 420a of FIG. 4B to form sectional image 210a of FIG. 4C. The creation of the sectional image 210a from the first image 210 stored in the memory 315 of FIG. 3 can be accomplished by the image control 315 or the processor 316 or any combination thereof.

The IPLD 100 upon receiving the appropriate command sets from the central controller 250 of FIG. 3 can produce the first image from the memory 315 of FIG. 3, select a collage type, and form the selected sectional image. The memory 315 of FIG. 3 can be RAM (random access memory), disc drive, ROM (read only memory) or other memory types. The motor power supply 320 of FIG. 3 supplies power to the motor control circuit and drivers 318. The motor control 318 receives instructions from the microprocessor 316 to control various motors including pan and tilt motors (not shown for simplification) that vary the position of the lamp housing 150 in relation to the yoke 130 and the yoke 130 in relation to the base housing 105. The processor 316 receives instructions to vary the pan and tilt of the lamp housing 150 in relation to the base housing 105 from the communications port 311 of FIG. 3 when the commands are received over the communications system from the central controller 250 of FIG. 2. The communications system may be comprised of central controller 250 of FIG. 2 or any type of controller that may communicate valid command signals and a communication connection such as communication line 230 or other type of connection that may be wireless as known in the art. Lamp power supply 321 provides power to the lamp 345 that produces the light that is projected by reflector 344 and condensing lens 347 to pass through the light valve 346. The light valve 346 forms the images such as the first image 210 and the sectional image 210a of FIG. 4C that are projected by the projection lens or aperture 180 of FIG. 3 in the direction of arrow 380 to the projection surface 220. The forming of the images formed by the light valve 346 are controlled by the image control 312.

The invention as described allows the operator of the central controller 250 to quickly visualize a collage type and select the appropriate image section for a particular IPLD. Using the invention allows multiple collage types to be formed by a plurality of IPLD during one show. For example vertical and horizontal collages with 3 to 12 IPLDs can quickly be formed on the projection surface during a rehearsal and quickly recalled by an operator of the central controller 250 of FIG. 3. It has also been found that projecting the sectional images of the first image without forming the collage such as those sectional images 210a, 212b, 214c and 216d shown in FIG. 5B and then repositioning the projected sectional images by using the pan and tilt parameters of the IPLDS 100, 102, 104 and 106 to form a collage in front of an audience creates a pleasing event. In FIG. 5B the IPLDs 100, 102, 104, and 106 have their lamp housings 150 repositioned in relation to the base housing 105 by varying the position parameter from the central controller 250 of FIG. 2. In FIG. 5B the sectional images 210a, 212b, 214c and 216d are positioned to be separated too far apart on the projection surface 220 to form the collage 500 and subsequent collage image 510. To please an audience the collage 500 and subsequent collage image 510 of FIG. 5A can have the separate images 210a, 212b, 214c and 216d separated by repositioning the pan and tilt parameters of the IPLDs 100, 102, 104, and 106 while the audience is directly viewing the show. This is done by repositioning the pan and tilt parameters live in front of an audience. When the separate images 210a, 212b, 214c and 216d are repositioned so as not to form the collage 500 and subsequent image 510 of FIG. 5A this results in the separation of the separate images as shown in FIG. 5B. Alternatively the separate images 210a, 212b, 214c and 216d of FIG. 5B can be repositioned by adjustment of the pan and tile parameters of IPLDs 100, 102, 104 and 106 to form the collage 500 and subsequent collage image 510 of FIG. 5A live in front of an audience to cause a pleasing effect.

In the areas where the separate images 210a, 212b, 214c, and 216d intersect or touch to form collage 500 and subsequent collage image 510 the intersection points may have the edges softened. Fading transitions can take place from projecting the first image 210 of FIG. 4D by IPLD 100 to the projection of sectional image 212b of FIG. 4F so that a pleasing transition takes place if desired. Although a graphical representation of a collage type 420 is shown projected by IPLD 100 of FIG. 4B the collage type could be identified with alphanumeric identification. Simply projecting "collage type 2×2" and "image section 210a" would help to show an operator of the central controller 250 of FIG. 3 the collage type and the image section selected for IPLD 100. However the use of a graphical representation is more intuitive especially when building several different types of collages rapidly with a plurality of IPLDs for use on a show.

The description of the invention and its applications as set forth herein is illustrative and is not intended to limit the scope of the invention as set forth in the following claims. Variations and modifications of the embodiments disclosed herein are possible and practical alternatives to and equivalents of the various elements of the embodiments are known to those of ordinary skill in the art. These and other variations and modifications of the embodiments disclosed herein may be made without departing from the scope and spirit of the invention.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

What is claimed is:

1. An image projection lighting device comprising:
 a base;
 a communications port;
 a processor;
 a memory;
 a lamp housing;
 the lamp housing comprising;
  a lamp,
  and a first light valve;
  wherein the lamp housing is configured so that the lamp housing can be remotely positioned in relation to the base by an actuator;
  wherein a plurality of images are stored in the memory including a first image;
  wherein the processor is programmed to produce, in response to a first command received by the communications port, a first graphic comprised of a plurality of sectional identifiers; and in response to the first command, the processor is programmed to cause the first light valve in cooperation with the lamp to project the first graphic onto a projection surface;
  wherein the processor is programmed to produce, in response to a second command received by the communications port, a sectional selection indicator which identifies a first sectional identifier of the plurality of sectional identifiers of the first graphic and wherein, in response to the second command, the processor is programmed to cause the sectional selection indicator to be projected onto the projection surface;
  wherein the processor is programmed to produce, in response to a third command, a first sectional image which is identified by the first sectional identifier and wherein the first sectional image is a component of the image;
  and wherein, in response to the third command, the processor is programmed to cause the first sectional image to be projected onto a projection surface.

2. The image projection lighting device of claim 1 wherein the image projection lighting device is configured to form and project onto the projection surface a graphical representation of a collage type in response to the first command and the second command.

3. The image projection lighting device of claim 1 wherein the image projection lighting device is configured to allow an operator to select the first sectional image to be projected onto the projection surface.

4. The image projection lighting device of claim 1 wherein the first and second commands are command compatible with DMX protocol.

5. An image projection lighting device comprising:
a base;
a communications port;
a processor;
a memory;
a lamp housing;
the lamp housing comprising;
   a lamp,
   and a first light valve;
   wherein the lamp housing is configured so that the lamp housing can be remotely positioned in relation to the base by an actuator;
   wherein a plurality of images are stored in the memory including a first image;
   wherein the communications port is adapted to receive a command to produce a first sectional image from the first image;
   wherein the image projection lighting device is configured to project the first sectional image onto a projection surface in response to the command;
   and wherein the first sectional image forms a collage on the projection surface that creates the first image when the first sectional image is combined with a second sectional image projected onto the projection surface from one or more further image projection lighting devices.

6. The image projection lighting device of claim 5 wherein the image projection lighting device is configured to project a graphical representation of collage type onto the projection surface.

7. The image projection lighting device of claim 5 wherein the image projection lighting device is configured to allow an operator to select the first sectional image.

8. The image projection lighting device of claim 5 wherein the command is compatible with DMX protocol.

9. An image projection lighting device comprising:
a base;
a communications port;
a processor;
a memory;
a lamp housing;
the lamp housing comprising;
   a lamp,
   and a first light valve;
wherein the lamp housing is configured so that the lamp housing can be remotely positioned in relation to the base by an actuator;
wherein a plurality of images are stored in the memory including a first image;
   wherein a plurality of collage types are stored in the memory;
   wherein the image projection lighting device is configured to allow a selection of a first one of the plurality of collage types by a first command received at the communications port;
   wherein a plurality of image sections associated with each collage type is stored in the memory,
   and wherein the image projection lighting device is configured to allow a first image section of the plurality of image sections associated with the first collage type to be selected by a second command received at the communications port.

10. The image projection lighting device of claim 9 wherein
the image projection lighting device is configured to receive a third command and to sectionalize the first image stored in the memory in response to the third command.

11. The image projection lighting device of claim 9 wherein
the image projection lighting device is configured to project a graphical representation of the first collage type on the projection surface in response to the first command.

12. The image projection lighting device of claim 11 wherein
the image projection lighting device is configured to allow the selection of an image section in response to the second command.

13. The image projection lighting device of claim 9 further comprising
the image projection lighting device is configured to project a alphanumeric representation of the first collage type onto the projection surface in response to the first command.

14. A method of operation for an image projection lighting device, wherein the image projection lighting device is comprised of a light valve, a memory, and a processor, the method comprising:
storing a first image in the memory of the image projection lighting device;
determining a first collage type from a plurality of collage types stored in the memory of the image projection lighting device;
determining by using the processor of the image projection lighting device, a first image section from a plurality of sections of the first collage type;
sectionalizing the first image to create a first sectional image by referencing the first image section; and
projecting the first sectional image from the image projection lighting device as a component of the first collage type.

15. The method of claim 14 further comprising
receiving a command signal at the image projection lighting device; and
wherein the first collage type is determined by the command signal.

16. The method of claim 14 further comprising
receiving a command signal at the image projection lighting device; and
wherein the first image section is determined by the command signal.

17. The method of claim 15 wherein
the command signal is compliant with DMX protocol.

18. The method of claim 16 wherein
the command signal is compliant with DMX protocol.

19. The method of claim 14 wherein
the first collage type is projected onto the projection surface.

20. The method of claim 19 wherein
the first collage type is projected as a graphic representation.

21. The method of claim 20 further comprising
projecting a graphic representation of the plurality of sections.

22. The method of claim 21 wherein
at least one of the plurality of sections is a tile.

23. The method of claim 19 wherein
the first collage type includes alphanumeric characters.

24. A method of operating a plurality of image projection lighting devices to form a first collage type on a projection surface from a plurality of collage types comprising:
storing a first image in a memory of each one of the plurality of image projection lighting devices;
forming a sectional image from the first image at each one of the plurality of image projection lighting devices, wherein each one of the sectional images formed by the plurality of image projection lighting devices is a different component of the first collage type.

25. The method of claim 24 further comprising
operating the plurality of image projection lighting devices to form a second collage type from the plurality of collage types.

26. A method of operation for an image projection lighting device comprising
storing a first image in a memory of the image projection lighting device;
storing a plurality of collage types and a plurality of corresponding image sections of the first image in the memory.

27. The method of claim 26 further comprising
selecting a first collage type of the plurality of collage types when a first command is received at a communications port of the image projection lighting device.

28. The method of claim 27 further comprising
receiving the first command in compatibility with DMX protocol.

29. A method of operation for an image projection lighting device comprising
storing a plurality of images in a memory of the image projection lighting device;
forming a first sectional image using a processor of the image projection lighting device from a first image of the plurality of images in the memory as a component of a first collage type;
forming a second sectional image using a processor of the image projection lighting device from a second image of the plurality of images in the memory as a component of a second collage type; and
wherein the first collage type and the second collage type are comprised of different quantities of image sections.

30. An image projection lighting device comprising:
a base;
a communications port;
a processor;
a memory;
a lamp housing;
the lamp housing comprising;
a lamp,
and a first light valve; wherein the lamp housing is configured so that it can be remotely positioned in relation to the base by an actuator;
wherein a plurality of images are stored in the memory including a first image;
wherein a plurality of collage types are stored in the memory including a first collage type;
wherein the first image can be sectionalized to represent a component of the first collage type.

* * * * *